(12) United States Patent
Kanamaru et al.

(10) Patent No.: US 6,957,311 B2
(45) Date of Patent: Oct. 18, 2005

(54) DATA STORAGE APPARATUS, COMPUTER APPARATUS, DATA PROCESSING APPARATUS, AND DATA PROCESSING METHOD

(75) Inventors: Atsushi Kanamaru, Sagamirhara (JP); Koichi Kushida, Fujisawa (JP); Takahiro Saito, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 10/269,206

(22) Filed: Oct. 11, 2002

(65) Prior Publication Data

US 2003/0074526 A1    Apr. 17, 2003

(30) Foreign Application Priority Data

Oct. 12, 2001   (JP)  .............................. 2001-316036

(51) Int. Cl.⁷ ........................................... G06F 12/00
(52) U.S. Cl. ........................ 711/158; 711/4; 711/111; 711/112; 711/113; 711/167; 710/5; 710/6; 710/39; 710/40
(58) Field of Search .......................... 711/4, 111, 112, 711/113, 158, 167; 710/5, 6, 39, 40

(56) References Cited

U.S. PATENT DOCUMENTS

| | | | | |
|---|---|---|---|---|
| 5,379,379 A | * | 1/1995 | Becker et al. | .................. 711/3 |
| 5,870,625 A | * | 2/1999 | Chan et al. | .................... 710/5 |
| 6,014,737 A | * | 1/2000 | Kurata | ........................ 712/219 |
| 6,256,713 B1 | * | 7/2001 | Audityan et al. | ........... 711/141 |
| 6,412,030 B1 | * | 6/2002 | Adusumilli | ................... 710/33 |
| 6,418,510 B1 | * | 7/2002 | Lamberts | ..................... 711/113 |
| 2001/0011323 A1 | * | 8/2001 | Ohta et al. | ................... 711/112 |

* cited by examiner

*Primary Examiner*—Donald Sparks
*Assistant Examiner*—Bao Q Truong
(74) *Attorney, Agent, or Firm*—Ron Feece; William Gill (57) ABSTRACT

A method and apparatus for efficiently executing a read request issued from a host computer when write requests are cached in a cache memory.

14 Claims, 7 Drawing Sheets

DATA STORAGE APPARATUS, COMPUTER APPARATUS, DATA PROCESSING APPARATUS, AND DATA PROCESSING METHOD

BACKGROUND OF THE INVENTION

1. Field of the Invention

The present invention relates to a data storage apparatus represented by a hard disk drive, and more particularly to optimization of the execution order, write requests (Write Commands) for data to a medium and read requests (Read Commands) for data written to a storage medium.

2. Background Art

A hard disk drive is one of the most popular kinds of computer external storage apparatus. As is well known, on a magnetic disk that is the storage medium of a hard disk drive, tracks that divide the disk surface like annual tree rings are further divided radially into sectors, which are the minimum data recording units. The nearer the periphery of a disk, the higher is the possible linear recording density. With the Zoned Bit Recording method, which is the current mainstream magnetic disk data recording method, all tracks are grouped into a number of zones, and the linear recording density is uniform within each zone. Thus, since the length of a sector is normally 512 bytes, the number of sectors increases the nearer a track is to the periphery of a magnetic disk.

A hard disk drive is provided with a magnetic head for reading data recorded on a magnetic disk or writing data to a magnetic disk. This magnetic head is attached to an actuator mechanism that is made to oscillate by a VCM (Voice Coil Motor). When the magnetic head performs a data read or data write, the magnetic head is moved to and positioned at a prescribed track by driving the actuator mechanism. Movement of the magnetic head to a prescribed position is performed with the help of servo information recorded on the magnetic disk.

One method employed to improve the performance of a data storage apparatus such as a hard disk drive is to use cache memory and to cache write requests from the host system. With this method, when there is a write request from the host system, the host system command is completed by caching data in a cache memory, and subsequently writing the cached write request to the disk when there is no longer a command from the host system.

At this time, a single ring buffer method is generally used for cache memory handling. With the single ring buffer method, write requests from the host system are cached in a cache memory in time series form, and cached write requests are written to the disk starting with the oldest of those cached write requests. When all of the cache memory has been used up, caching continues from the start of the cache memory.

However, when cache memory is used to the end and is filled with data, there is no usable vacant area in the cache memory, and therefore no new caching is possible, as long as the oldest write request has not been written to the disk. That is to say, processing for commands from the host system cannot be completed until the oldest write request in the cache memory is written to the disk and a vacant area is provided in the cache memory.

When a write request is cached in a cache memory that employs a single ring buffer method in this way, if there is a read request from the host system, since processing proceeds in a time series, all cached write requests are first written to the disk, and then the read request is processed.

In order to process this read request more quickly, a method (Read Before Pending Write: RBPW) has been adopted whereby, when there is a read request, the read request is processed before write requests stored in a cache memory.

However, the disk write order of write requests has come to be optimized by using an algorithm such as RPO (Rotational Positioning Optimization) whereby all write requests cached in a cache memory can be written to the disk in the shortest time in units of write requests from the host system. With RPO, when a pending command is executed, the seek time from the start of a seek to the target track on the magnetic disk until that track is reached, and the disk latency until access of the target sector is started after the target track is reached, are predicted. Then, the pending command for which the sum of this seek time and latency is shortest is selected as the next command to be executed.

As a result of optimization of the disk write order by means of RPO, the disk write order for write requests cached in a cache memory ceases to be a time series, and it is even possible that the oldest write request may actually be the last to be written to the disk.

In such a case, even if there is a read request from the host system, since only a single ring buffer method is used, a command from the host system cannot be processed until the oldest write request is written to the disk, and in effect host system commands are kept waiting until all write requests cached in a cache memory have been written to the disk. Consequently, if there is a read request after write requests that use a large amount of a cache memory, it is probable that the host system will have to wait a very long time.

SUMMARY OF THE INVENTION

The present invention advantageously provides a method that enables a read request from a host system to be executed efficiently when write requests are cached in a cache memory, and a data storage apparatus that executes that method.

The inventors considered that it would be preferable to refer to the storage state of a cache memory when a read request is transferred, and in order to cache the read request quickly, to change the previous write order of write requests already stored in a cache memory regardless of that order. The inventors then reached the conclusion that it is possible to execute a read request efficiently if a write request necessary for caching the read request is executed first, and then the read request is executed. Heretofore used RBPW and RPO can of course be used in this process.

The present invention is based on the above consideration and solves the above described problem by means of a data storage apparatus provided with memory that has a plurality of storage areas that temporarily store write requests and read requests transferred from a host, a read/write head that performs write processing or read processing based on a write request or read request, a storage medium on which write data is stored by read/write head write processing and from which read data is read by read processing, order holding means that holds a write order to the recording medium of write requests stored in the memory, and write order determining means for changing a previous write order if, when a read request is transferred from the host, an area to store that read request cannot be secured in the memory.

In a data storage apparatus of the present invention, when an area to store a read request is secured in the memory when the oldest write request among a plurality of write requests stored in the memory is executed, the write order determining means makes the oldest write request first in the write order.

As described above, with a single ring buffer, writing of the first stored command is a condition for storing a new command. Therefore, if it is assumed that a single ring buffer is used as memory, the oldest write request is first executed, and then an attempt is made to secure a storage area for a read request.

In the above case, the read/write head executes write processing based on the oldest write request, then executes read processing based on a read request, and then executes write processing based on other write requests stored in the memory. According to this execution order, execution of a read request is not kept waiting, as heretofore, until after execution of all write requests, even if RPO is used.

In a data processing apparatus of the present invention, there are cases where an area to store a read request in the memory is not secured even if the oldest write request among write requests stored in the memory is executed. In such cases, when it may happen that an area to store that read request is secured in the memory when other prescribed write requests stored in the memory together with the oldest write request are executed preferentially, the write order determining means makes the write order of the oldest write request and the prescribed write requests higher than the write order of other write requests stored in the memory.

In this case the read/write head optimizes a write execution order and executes write processing based on the oldest write request and the prescribed write requests, then executes read processing based on the read request, and then executes write processing based on other write requests. According to this execution order, execution of a read request is almost never kept waiting, as heretofore, until after execution of all write requests, even if RPO is used.

As described above, the present invention is characterized in that the write order held in a cache memory is changed as appropriate based on the storage state in a cache memory. That is to say, the present invention is applied to a data storage apparatus provided with a head that performs write processing at a prescribed access position of a recording medium, cache memory that has a plurality of storage areas and caches a write request before execution of write processing by the head, and a controller that performs control so that write requests transferred from the host in a prescribed transfer order are read from the cache memory and also subjected to execution of write processing to the storage medium in a different order from that transfer order. This data storage apparatus controller is characterized by determining the order of write requests to be read from cache memory based on the write request storage state in the storage areas.

As described above, when a single ring buffer is used as cache memory, execution of the oldest write request should be given priority, and it is possible to determine whether or not read request caching is possible according to the vacancy situation of the storage area in which this oldest write request is stored and storage areas adjacent to that storage area. Therefore, as the write request storage state in storage areas, arrangement within a cache memory of storage areas in which write requests are stored and storage areas in which write requests are not stored is possible, and the order of write requests to be read from said cache memory can be determined based on this arrangement.

In a data storage apparatus of the present invention, cache memory caches a read request transferred from a host, and subsequently read processing is executed based on the read request. In this case, when a storage area necessary for caching of a read request is not vacant in a cache memory at the time of transfer, the controller in the data storage apparatus of the present invention refers to the arrangement within a cache memory of storage areas in which write requests are stored and storage areas in which write requests are not stored. Then the order of write requests to be read from cache memory is determined so as to secure a storage area necessary for read request caching.

Then, furthermore, the controller performs control so that, after a storage area necessary for read request caching has been secured, the read request is cached in a cache memory, and also the read request is executed before a write request stored earlier in a cache memory.

The present invention provides the following computer apparatus provided with a data storage apparatus whereby read request execution is made efficient. This computer apparatus is provided with a host that issues read requests and write requests including write data, and a data storage apparatus that reads from a storage medium, and transfers to the host, read data corresponding to a read request received from the host, and also writes to the storage medium write data included in a write request received from the host.

Also, if a read request is received when write requests for which write execution has not been performed are stored in a cache memory, the data storage apparatus executes the read request and transfers read data that has been read to the host after execution of the oldest write request among stored write requests, or after execution of the oldest write request and other write requests and before execution of all stored write requests. As this data storage apparatus can execute a read request before execution of all stored write requests, it does not incur performance degradation whereby a read request is executed after all write requests have been executed, as heretofore.

Here, above-mentioned other write requests are write requests that, in executing a read request, it is necessary to execute in preference to the read request for reasons relating to the functions of the data storage apparatus. For example, the oldest write data in the single ring buffer applies.

The present invention provides the following data processing apparatus that can be applied to the above data storage apparatus and computer apparatus. A data processing apparatus of the present invention receives read requests and write requests transferred from a host, and also orders execution of read requests and write requests with respect to a storage medium. Also, this data storage apparatus is characterized in being provided with storing means that has storage areas that temporarily store read requests and write requests, execution order holding means that holds the order for reading and executing the read requests and the write requests temporarily stored in the storing means, and write order determining means for changing the execution order of the write requests held in the execution order holding means so as to secure a storage area to store temporarily a read request if a storage area to store temporarily a read request in the storing means cannot be secured at the time when that read request is received.

As a data storage apparatus of the present invention changes the write request execution order held in the execution order holding means so as to secure a storage area to store temporarily a read request if a storage area to store temporarily a read request in the storing means cannot be secured at the time when that read request is received, it is not necessary for a read request to be kept waiting until all write requests have been executed.

In a data storage apparatus of the present invention, the storing means allows storage of a new read request or write request on condition that the first stored write request is read. The above described single ring buffer is applicable to this.

Also, the write order determining means changes the write request execution order held in the execution order holding means on the premise that the first stored write request is read.

The present invention provides the following data processing method that can be applied to the above data storage apparatus, computer apparatus, or data processing apparatus. That is to say, the present invention is a data processing method whereby, after read requests and write requests transferred from a host have been cached, read requests and write requests are executed with respect to a storage medium, and is characterized in that the oldest write request among cached write requests is executed, then a read request is executed, and thereafter other write requests excluding the oldest write request among the cached write requests are executed sequentially.

In a data processing method of the present invention, if a read request cannot be cached at the time when that read request is received, the oldest write request among cached write requests can be executed. Also, as explained heretofore, if a read request can be cached after the oldest write request has been executed, that read request is cached and then executed. If a read request cannot be cached after the oldest write request has been executed, the execution order including other prescribed write requests is optimized and executed, after which that read request is cached and then executed. Thus, according to the present invention, a read request is not kept waiting until all write requests have been executed.

Also, in a data processing method of the present invention, if a read request can be cached at the time when that read request is received, that read request is executed preferentially to all cached write requests. This shows that conventional RBPW may be executed in the present invention.

Furthermore, the present invention is a data processing method whereby, after read requests and write requests transferred from a host have been cached, read requests and write requests are executed with respect to a storage medium, and is characterized in that it is determined at the time when a read request is received whether or not that read request can be cached, and if it is determined that the read request cannot be cached, prescribed write requests among cached write requests are executed after execution order optimization in order to provide a vacant area for caching the read request, then the read request is executed, and thereafter other write requests excluding the prescribed write requests among the cached write requests are executed.

In a data processing method of the present invention, if a read request cannot be cached at the time when that read request is received, prescribed write requests are executed after execution order optimization. These prescribed write requests include the oldest write request among cached write requests. After the prescribed write requests have been executed, the read request is executed, and thereafter other write requests excluding the prescribed write requests among the cached write requests are executed. Thus, according to the present invention, a read request is not kept waiting until all write requests have been executed.

In a data processing method of the present invention, execution of prescribed write requests and execution of other write requests excluding the prescribed write requests are performed in an order such that time required for the execution is minimized. This suggests the application of RPO to the present invention.

DETAILED DESCRIPTION OF THE PREFERRED EMBODIMENTS

The present invention will now be described in detail based on the embodiment shown in the attached drawings taking a hard disk drive as an example.

Figure 1:
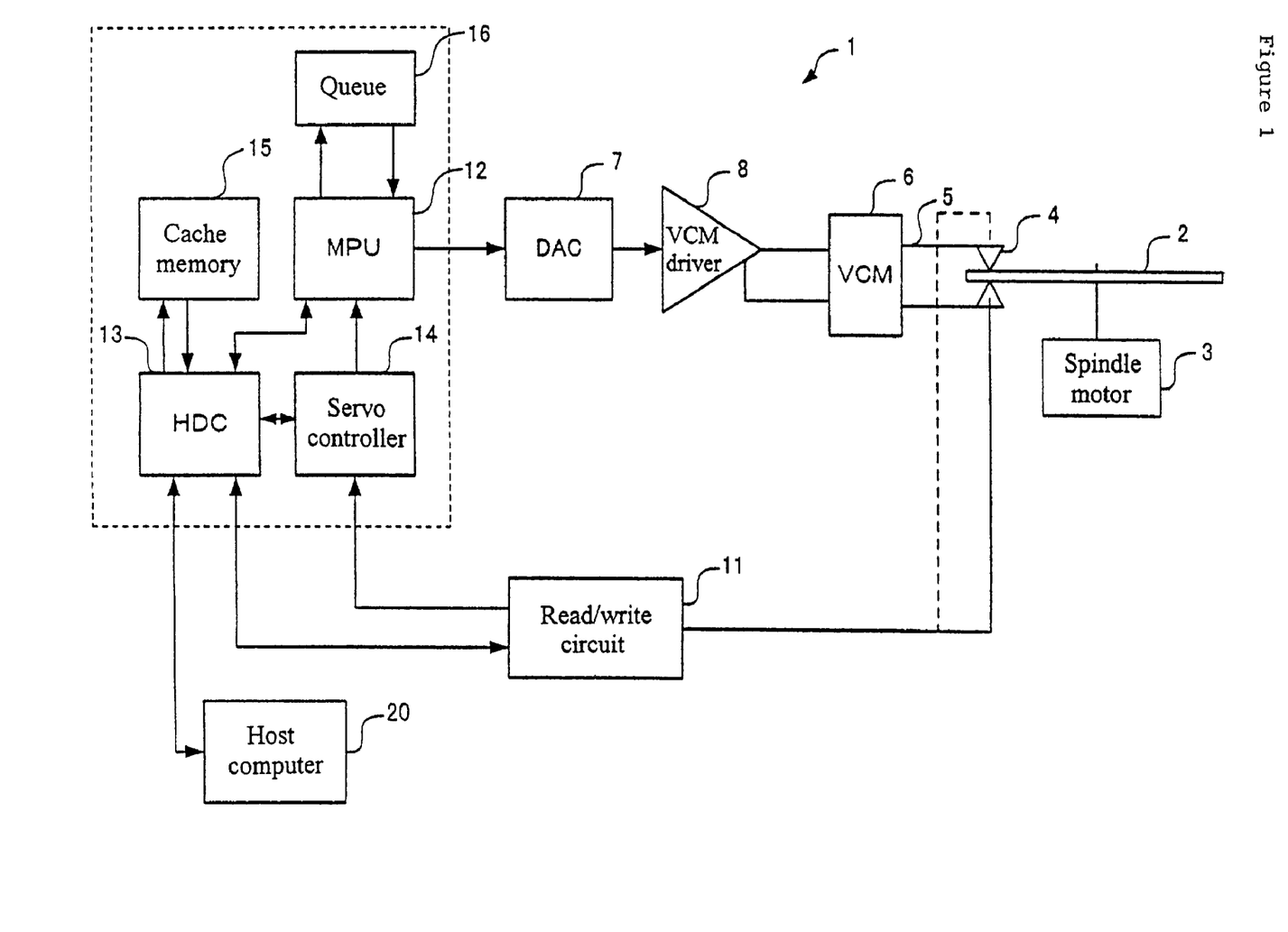
FIG. 1 is a block diagram showing the configuration of a hard disk drive according to this embodiment.

FIG. 1 is a block diagram showing the main parts of a hard disk drive 1 according to this embodiment. The hard disk drive 1 is a data recording and playback apparatus in which a magnetic head 4 seeks on a magnetic disk 2 rotated by a spindle motor 3, and stops at a prescribed track (position) and writes data to the magnetic disk 2 or reads data written to the magnetic disk 2. A single magnetic disk 2 or a plurality of magnetic disks 2 are provided as necessary. In this embodiment an example of a single magnetic disk 2 is shown.

When the hard disk drive 1 is operating, the magnetic disk 2 is rotated by the spindle motor 3 about the spindle axis, and when the hard disk drive 1 is not operating, the magnetic disk 2 stops rotating (is stationary). On the surface of the magnetic disk 2, a plurality of position information (servo information) storage areas are formed radially in a radiating arrangement on the magnetic disk 2, and data storage areas are formed in other areas. By having the magnetic head 4 read this servo information, it is possible to ascertain the position of the magnetic head 4. The servo information is configured from track identification data and a burst pattern.

Track identification information indicates the track address of each data track. By having the magnetic head 4 read this track identification information, it is possible to determine the track position at which the magnetic head 4 is currently positioned. As the burst pattern, areas in which individually signals are stored are arranged at fixed intervals radially on the magnetic disk 2, comprising a plurality of signal storage area series whose signal storage area phases are mutually different. Based on a signal output from this burst pattern, it is possible to determine the amount of drift of the magnetic head 4 with respect to a data track.

There are two magnetic heads 4 on the tip part of an actuator 5, corresponding to the upper and lower surfaces of the magnetic disk 2. The magnetic heads 4 execute data reads and writes on the magnetic disk 2, and also read servo information stored on the magnetic disk 2. The magnetic heads 4 are integral with the actuator 5, and move radially across the magnetic disk 2. A ramp (not shown) is located outside the periphery of the magnetic disk 2 to hold the magnetic heads 4 when they are not driven.

A read/write circuit 11 executes data read/write processing. That is to say, write data transferred from a host computer 20 via an HDC (hard disk controller) 13 is converted to a write signal (current) and supplied to the magnetic head 4. The magnetic head 4 executes a data write to the magnetic disk 2 based on this write current. On the other hand, a read signal (current) read from the magnetic disk 2 is converted to digital data and output to the host computer 20 via the HDC 13.

A servo controller 14 extracts servo information from data read from the read/write circuit 11. As stated above, servo information includes track identification information and a burst pattern. The extracted servo information is transferred to an MPU (Micro Processing Unit) 12. Also, the amount of drift of the magnetic head 4 from the track center is found from the servo information, and is sent to the HDC 13.

The actuator 5 is driven by a VCM (voice coil motor) 6. Therefore, the VCM 6 can also drive the magnetic head 4. The VCM 6 is composed of a movable part with a coil as an element and a fixed part with a permanent magnet as an element. When a prescribed current is supplied to this coil from a VCM driver 8, the movable part is driven, and the magnetic head 4 moves to or stops at a prescribed position on the magnetic disk 2.

The HDC (hard disk controller) 13 has functions as an interface for the hard disk drive 1. One of these functions is to receive write data transferred from the host computer 20 and also transfer a received write request to cache memory 15. As this write request includes write data, it may be referred to below as write data as appropriate.

When a write request is transferred to cache memory 15, the HDC 13 issues a Command Complete signal to the host computer 20 to give notification. For the hard disk drive 1, this Command Complete signal is issued as if write processing had been performed even at a stage where write processing has not actually been performed. This signal is issued when there is vacant space in the cache memory 15 and is, so to speak, a notification that prompts a write data transfer from the host, or permits transfer of write data.

Write data temporarily stored in the cache memory 15 is read by the HDC 13 based on a directive from the MPU 12, and is transferred to the read/write circuit 11. The HDC 13 also transfers to the host computer 20 read data transferred from the read/write circuit 11.

A queue 16 holds the write order of write data stored in the cache memory 15. This write order is determined by the MPU 12 and HDC 13. Write data stored in the cache memory 15 is written sequentially to the magnetic disk 2 according to the write order stored in the queue 16. The hard disk drive 1 according to this embodiment is characterized in that, when there is a read request, the hard disk drive 1 refers to the cache state in the cache memory 15, and changes the write order in the queue 16 as appropriate. The parts associated with this characteristic will be described in greater detail.

The MPU 12 and HDC 13 handle control of the hard disk drive 1 in a coupled fashion. The MPU 12 interprets and executes a program stored in a memory (not shown). The MPU 12 determines the position of the magnetic head 4 based on servo information transferred from the servo controller 14, and, based on the distance between the determined magnetic head 4 position and the target position, outputs a magnetic head 4 positioning control current to a digital/analog converter (DAC) 7.

The DAC 7 converts the positioning control current output from the MPU 12 to an analog signal (voltage signal), and outputs this analog signal to the VCM driver 8. The VCM driver 8 converts the voltage signal received from the DAC 7 to a drive current, and supplies this drive current to the VCM 6.

When executing write requests, the hard disk drive 1 employs above described RBPW and RPO in order to improve performance. Furthermore, when there is a read request, the hard disk drive 1 refers to the cache state in the cache memory 15 and changes the write order in the queue 16 as appropriate. This is done in order to improve the efficiency of read request execution. The execution procedure for read requests and write requests in the hard disk drive 1 will be described below based on FIG. 2 through FIG. 10.

Figure 2:
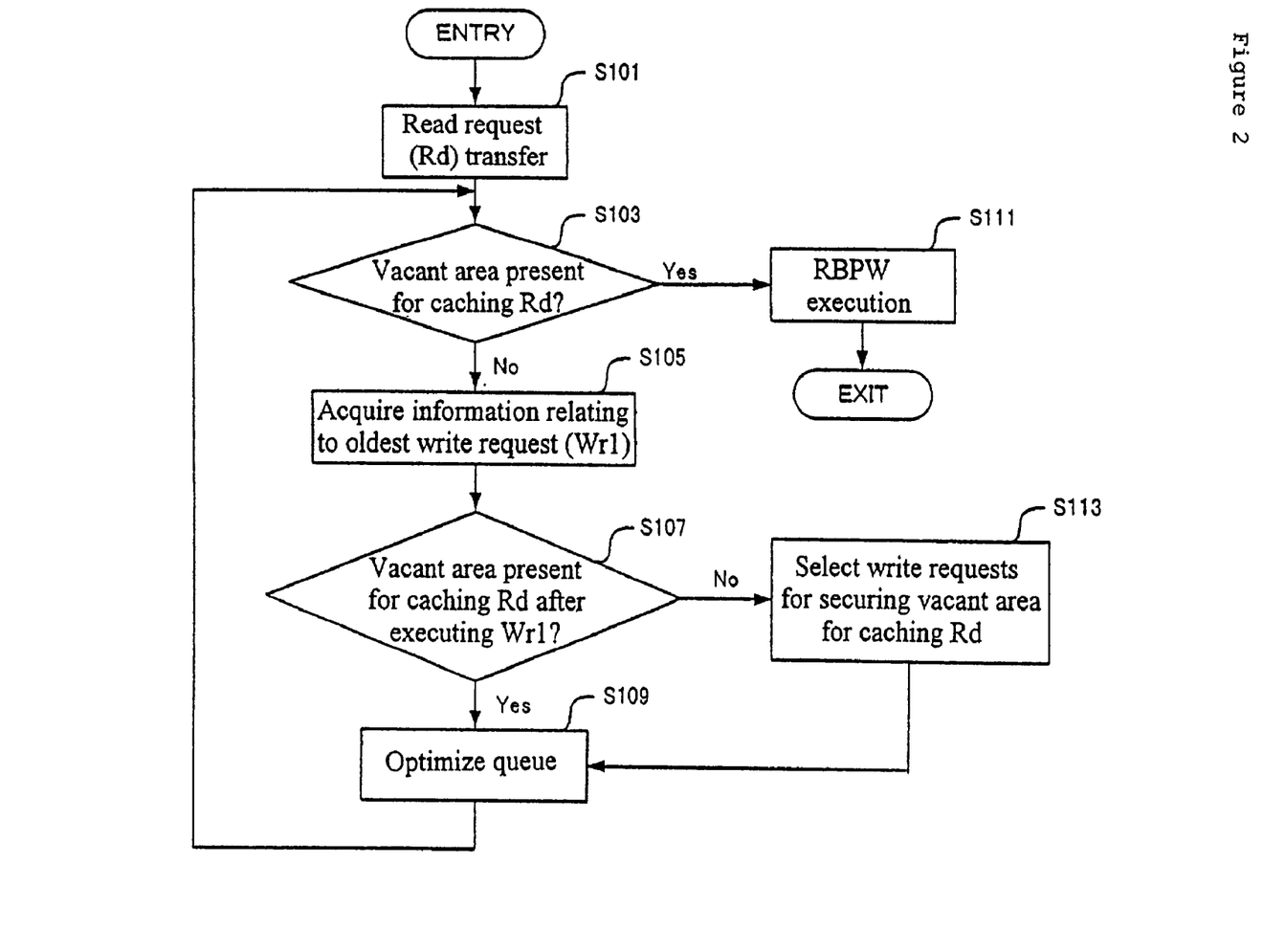
FIG. 2 is a flowchart showing the execution procedure for read requests and write requests in a hard disk drive according to this embodiment.

As shown in FIG. 2, this execution procedure starts from the point at which a Read request (Rd) is transferred from the host (S101 in FIG. 2).

Figure 3:
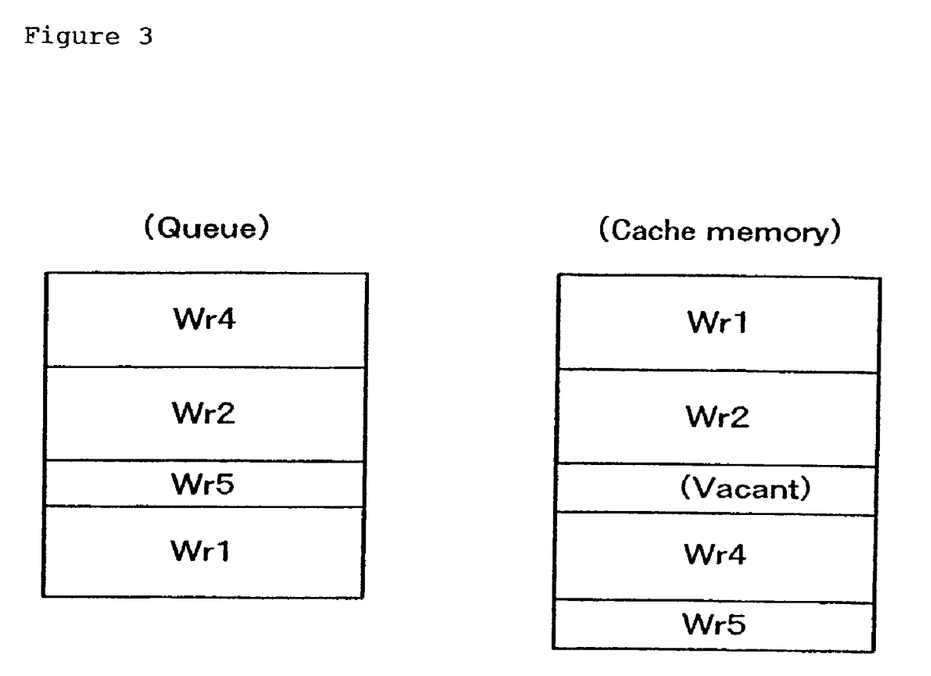
FIG. 3 is a drawing showing the storage state of a cache memory at the time when a write request (Wr) is transferred according to this embodiment.

FIG. 3 shows an example of the state of the cache memory 15 and queue 16 at this time. The purpose of FIG. 3 is to explain the relationship between the cache memory 15 and queue 16, and examples of the cache memory 15 and queue 16 with different states may be shown in the subsequent steps (procedure).

Here, FIG. 3 shows an example in which four write requests—Wr1, Wr2, Wr4, and Wr5—are cached in the cache memory 15, and there is a 1-sector vacant area. The numerals (1, 2, 4, 5) of write requests Wr1, Wr2, Wr4, and Wr5 indicate the order in which they were stored in the cache memory 15. That is to say, these write requests were stored in the cache memory 15 in the order: Wr1, Wr2, Wr4, Wr5. Therefore, in this state, Wr1 is the oldest write request.

On the other hand, the queue 16 holds the execution order of write requests Wr1, Wr2, Wr4, and Wr5 temporarily stored in the cache memory 15. That is to say, the queue 16 shows that write processing is to be executed in top-down order Wr4, Wr2, Wr5, Wr1. This write order is different from the order in which the write requests were stored in the cache memory 15. This write order is determined by means of above described RPO so that the four write requests Wr1, Wr2, Wr4, and Wr5 will be executed in the shortest time. This order is decided jointly by the MPU 12 and HDC 13 based on the current position of the magnetic head 4, and the positions of the sectors on the magnetic disk 2 to which write data is to be written by Wr1, Wr2, Wr4, and Wr5.

When a write request is transferred from the host computer 20, the HDC 13 determines whether or not a vacant area for caching that write request can be secured in the cache memory 15 (S103 in FIG. 2). For instance, FIG. 4 shows examples of the cache memory 15 storage state at the time when a read request (Rd) is transferred, with (a) showing an example where a vacant storage area for a write request is secured, and (b) showing an example where a vacant storage area for a write request is not secured.

Figure 4:
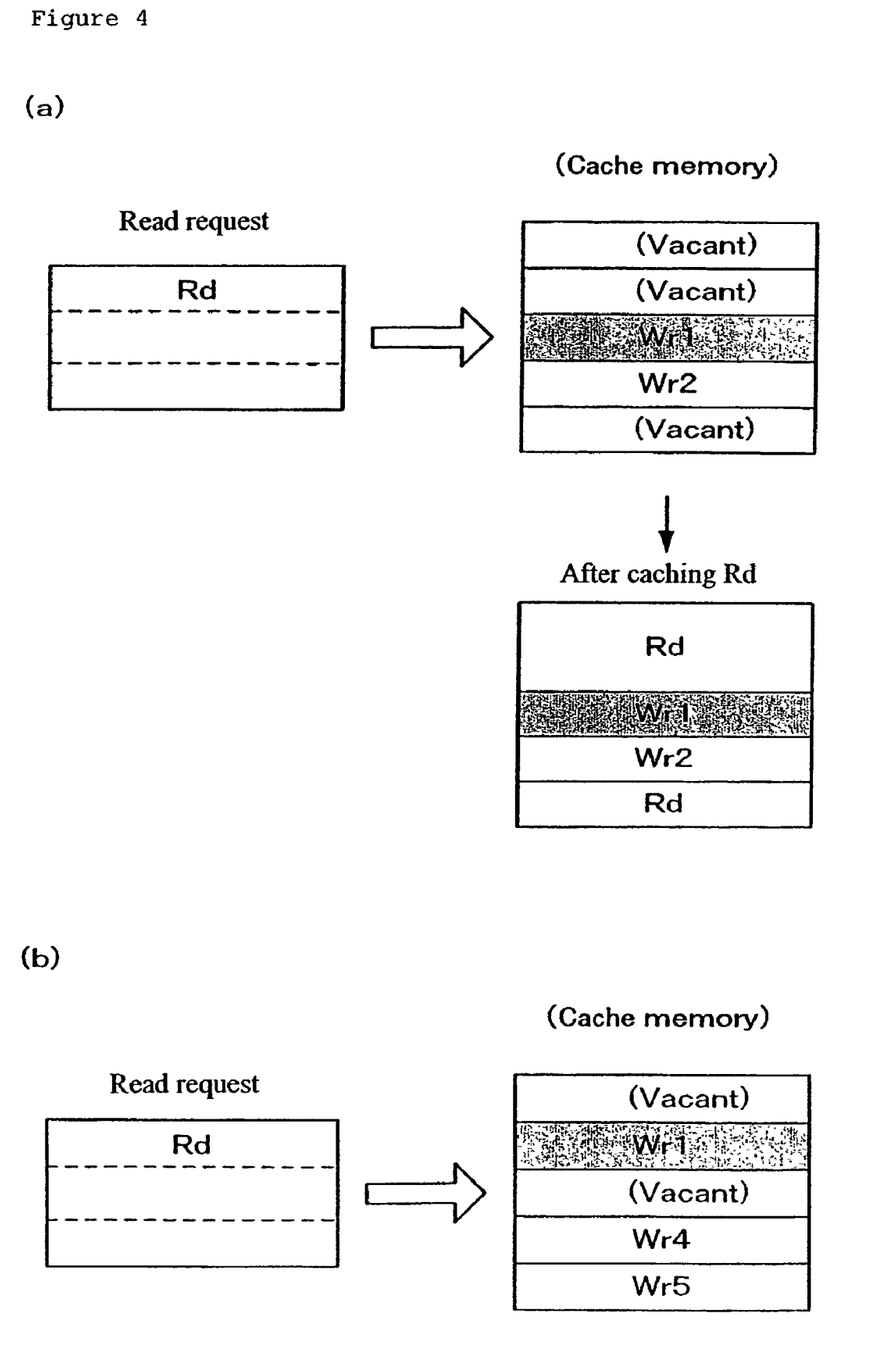
FIG. 4 is a drawing showing examples of the cache memory storage state at the time when a Read request (Rd) is transferred according to this embodiment, with (a) showing an example where a vacant area for a Read request is secured, and (b) showing an example where a vacant area is not secured.

In FIG. 4, the transferred read request (Rd) has a size of 3 sectors. On the other hand, in the example in FIG. 4(a), two write requests Wr1 and Wr2 are stored in the 3rd and 4th storage areas from the top (hereinafter "from the top" will be omitted) in the cache memory 15, and the 1st, 2nd, and 5th storage areas are vacant. These vacant storage areas have a total size of 3 sectors. The cache memory 15 that has this storage state can cache the transferred read request (Rd) in the 1st, 2nd, and 5th storage areas in 5th, 1st, 2nd order. The state of the cache memory 15 after the read request (Rd) has been cached is also shown in FIG. 4(a).

When vacant storage areas for caching a read request (Rd) transferred to the cache memory 15 are secured, as above, RBPW is executed (S111 in FIG. 2) after that read request (Rd) has been cached. In the example in FIG. 4(a), the read request (Rd) is executed before execution of write requests Wr1 and Wr2. Execution here means that the magnetic head 4 accesses a prescribed position on the magnetic disk 2 and reads the read data specified in the command.

In the example in FIG. 4(b), three write requests Wr1, Wr4, and Wr5 are stored in the cache memory 15, and there are vacant areas equivalent to 2 sectors. As the read request (Rd) has a size of 3 sectors, a storage area for caching that read request (Rd) cannot be secured in the cache memory 15 (S103 in FIG. 2).

In this case, the HDC 13 acquires information relating to the least recently stored (oldest) write request among the write requests stored in the cache memory 15 (S105 in FIG. 2). Information relating to the oldest write request comprises the size of write data included in the write request and the location in the cache memory 15.

When the oldest write data is acquired, the HDC 13 executes the oldest write request and then determines whether or not a vacant storage area for caching the read request (Rd) can be secured in the cache memory 15 (S107 in FIG. 2). This procedure will be described based on FIG. 5 through FIG. 8.

Figure 5:
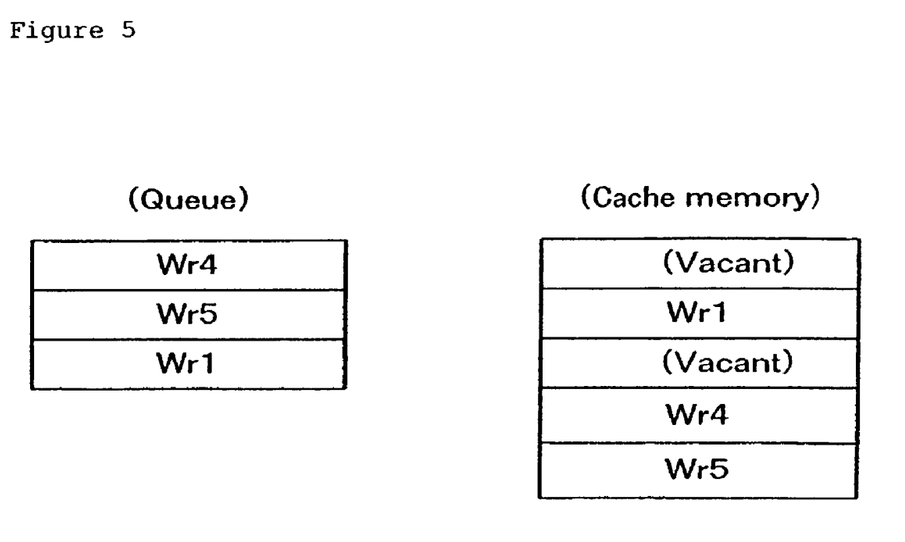
FIG. 5 is a drawing showing the state of the queue and cache memory when information relating to the oldest write data is obtained according to this embodiment.

FIG. 5 shows the state of the cache memory 15 and queue 16 when information relating to the oldest write data is obtained. Stored in the cache memory 15 at the present point in time are write request Wr1 in the 2nd storage area, write request Wr4 in the 4th storage area, and write request Wr5 in the 5th storage area. Of these, Wr1 is the oldest write request. The queue 16 shows that write requests are to be executed in the order: Wr4, Wr5, Wr1.

Assume that a read request (Rd) is transferred from the host computer 20 while the state of the cache memory 15 and queue 16 is as shown in FIG. 5. When this happens, information relating to the oldest write request, Wr1, is acquired from the cache memory 15. In the example in FIG. 5, the information that Wr1 has a size of 1 sector and is stored in the 3rd storage area is acquired (S105 in FIG. 2). At this time, similar information relating to vacant storage areas is also acquired.

Based on the above information—more specifically, on the arrangement of storage areas in which write requests are stored and vacant storage areas—after oldest write request Wr1 has been executed, it is determined whether or not a storage area for caching the read request (Rd) can be secured in the cache memory 15 (S107 in FIG. 2). The way in which this is determined is shown in FIG. 6 and FIG. 8.

Figure 6:
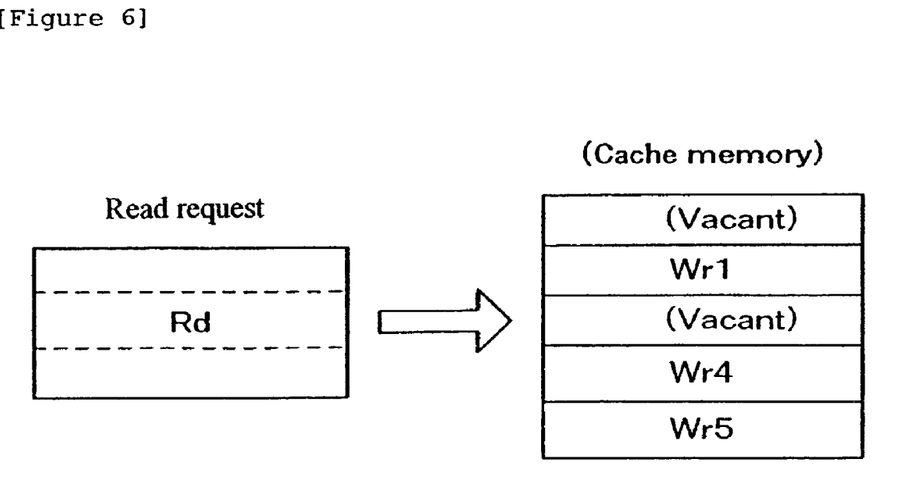
FIG. 6 is a drawing showing the state in which a vacant area for a read request is secured when the oldest write data is written according to this embodiment.

In the case shown in FIG. 6, when write request Wr1 with a size of 1 sector and stored in the 2nd storage area is executed, the 2nd storage area becomes a vacant storage area. The cache memory 15 then has three vacant storage areas: the 1st through 3rd storage areas. These three storage areas have a total size of 3 sectors. It is thus determined that the 3-sector read request (Rd) can be stored in the 1st through 3rd storage areas of the cache memory 15 (S107 in FIG. 2).

Figure 7:
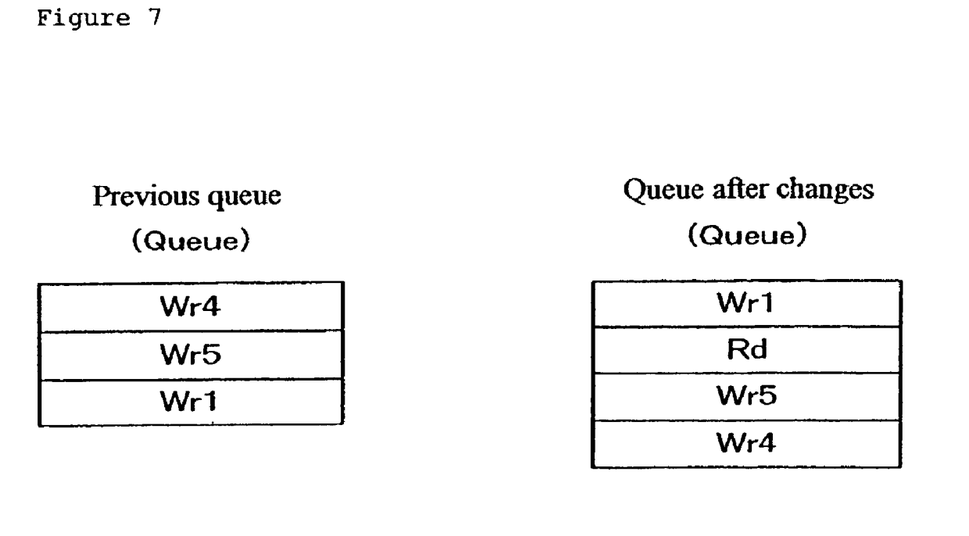
FIG. 7 is a drawing showing the state in which write requests in the queue are changed in the case of a state in which a vacant area for a read request is secured when the oldest write data is written according to this embodiment.

After oldest write request Wr1 has been executed, if it is determined that a vacant storage area for caching the read request (Rd) can be secured in the cache memory 15, the write order in the queue 16 is changed (S109 in FIG. 2). This is illustrated in FIG. 7. Assume, for example, that the queue 16 before the read request (Rd) is transferred ("Previous queue" in FIG. 7) shows a write request execution order of Wr4, Wr5, Wr1. However, after oldest write request Wr1 has been executed, based on the determination that a vacant storage area for caching the read request (Rd) can be secured in the cache memory 15, Wr1, which had the lowest position in the write order in the previous queue 16 is moved up to the 1st position in the write order ("Queue after changes" in FIG. 7). Then, in accordance with Wr1 having taken the 1st position in the write order in the queue 16, RPO is applied and it is established that write requests are to be executed in the order: Wr5, Wr4 (S109 in FIG. 2). When Wr1 is executed as indicated by the queue 16, the 2nd storage area in the cache memory 15 becomes a vacant storage area, and the three storage areas from the 1st through the 3rd storage areas become vacant. Thus, a vacant storage area for caching the read request (Rd) is secured in the cache memory 15 (S103 in FIG. 2), and, by means of RBPW, the read request (Rd) is executed before write requests Wr4 and Wr5. After the read request (Rd) has been executed, write requests Wr5 and Wr4 are executed in that order, as shown in the queue 16 after changes in FIG. 7.

Figure 8:
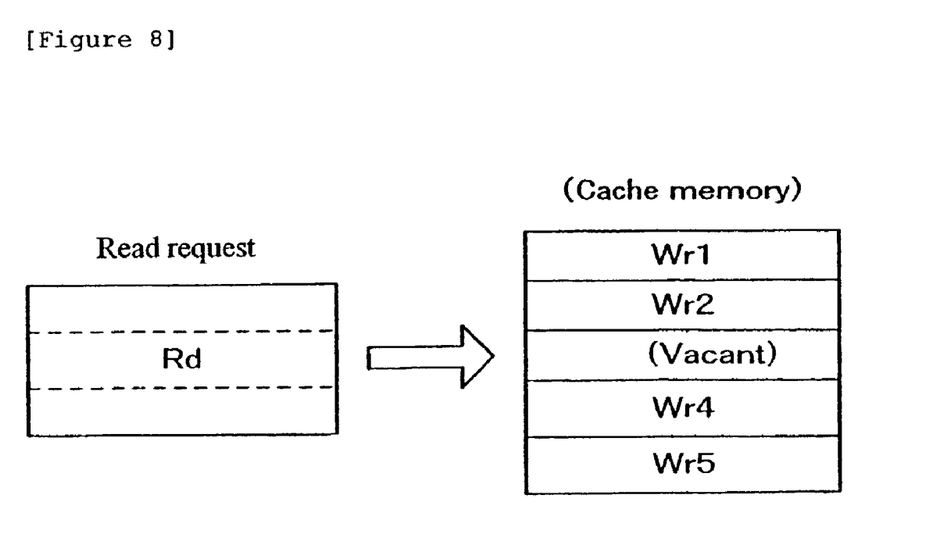
FIG. 8 is a drawing showing a state in which a vacant area for a read request is not secured even if the oldest write data is written according to this embodiment.

Meanwhile, FIG. 8 shows an example in which a read request (Rd) cannot be cached even if the oldest write request, Wr1, is executed. In the example in FIG. 8, the cache memory 15 stores oldest write request Wr1 in the 1st storage area, write request Wr2 in the 2nd storage area, write request Wr4 in the 4th storage area, and write request Wr5 in the 5th storage area. The 3rd storage area is a vacant storage area.

In a storage state such as this, even if oldest write request Wr1 stored in the 1st storage area is executed, the vacant storage areas formed are the 1st and 3rd storage areas equivalent to 2 sectors. It is therefore determined that the read request (Rd), which is 3 sectors in size, cannot be cached (S107 in FIG. 2). If this situation is left as it is, execution of the read request (Rd) will be deferred.

Thus, write requests to be executed preferentially together with oldest write request Wr1 are selected (S113 in FIG. 2). The operational procedure for this will be described based on FIG. 9 and FIG. 10.

Figure 9:
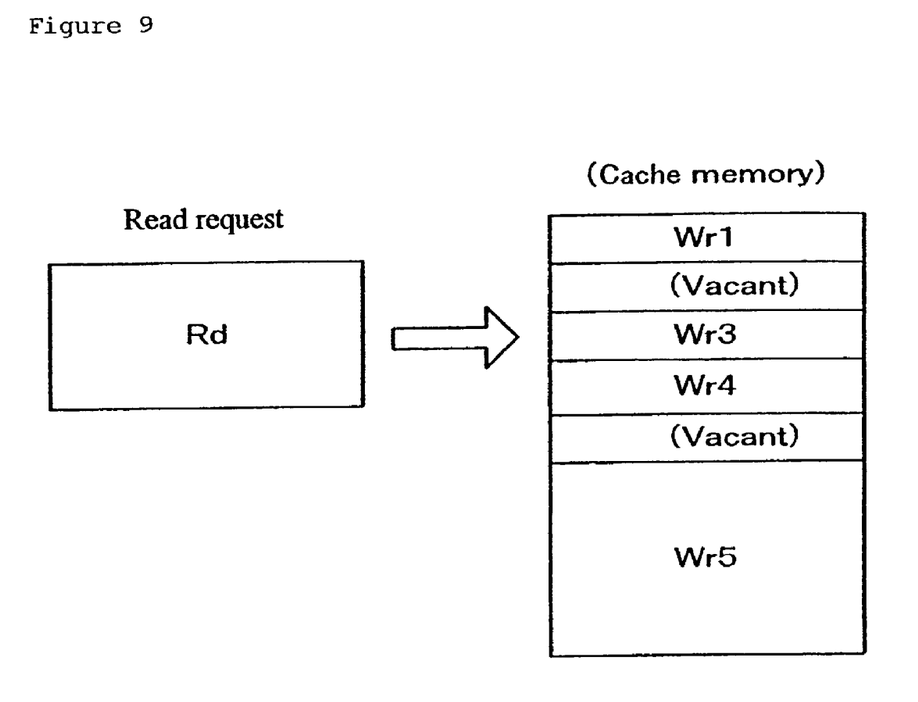
FIG. 9 is a drawing showing the situation when searching for a write request to be executed in order to secure a vacant area in a cache memory for a read request according to this embodiment.

Assume that, as shown in FIG. 9, the cache memory 15 stores oldest write request Wr1 in the 1st storage area, write request Wr3 in the 3rd storage area, write request Wr4 in the 4th storage area, and write request Wr5 in the 6th storage area, while the 2nd storage area and 5th storage area are vacant storage areas.

Assume that a 3-sector read request is transferred from the host computer 20 to the cache memory 15 in this storage state. Even if oldest write request Wr1 is executed, the only consecutive vacant storage areas will be the 1st and 2nd, equivalent to 2 sectors. Therefore, it is not possible to enable the read request (Rd) to be cached simply by executing oldest write request Wr1. In the case shown in FIG. 9, it is determined that the read request (Rd) can be cached if Wr3 and Wr4 are executed together with Wr1. Thus, Wr1, Wr3, and Wr4 are selected to be executed preferentially to other write requests (S113 in FIG. 2), and the execution order in the queue 16 is changed (S109 in FIG. 2).

Figure 10:
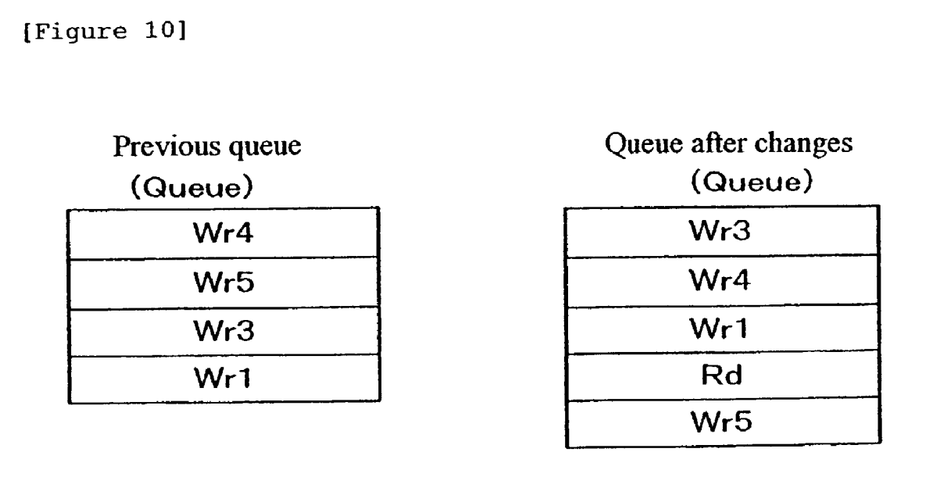
FIG. 10 is a drawing showing a change of order in the queue performed in order to secure a vacant area in a cache memory for a read request according to this embodiment.

The way in which the queue 16 is changed is illustrated in FIG. 10. Assume that the previous execution order was: Wr4, Wr5, Wr3, Wr1. With this execution order, Wr1, Wr3, and Wr4 are given priority over other write requests—that is to say, over Wr5. To be more specific, through the application of RPO, write processing is executed in the order: Wr3, Wr4, Wr1.

When write requests Wr3, Wr4, and Wr1 have been executed, the 1st through 4th storage areas in the cache memory 15 are vacant. Thus, a vacant storage area for caching the read request (Rd) is secured in the cache memory 15 (S103 in FIG. 2), and by means of RBPW, the read request (Rd) is executed before write request Wr5. After the read request (Rd) has been executed, Wr5 is executed as shown in the queue 16 after changes in FIG. 10.

As described above, when a read request is transferred from the host computer 20, the hard disk drive 1 according to this embodiment changes the execution order of write requests stored in the cache memory 15 based on the stored state of the cache memory 15. To be more specific, it is determined whether or not the storage state of the cache memory 15 allows the read request to be cached (S103 in FIG. 2). Then, if the read request cannot be cached, read request caching in the cache memory 15 is made possible by executing the oldest write request, and also other prescribed write requests after execution order optimization (S107 and S113 in FIG. 2). Then, by means of RBPW, the cached read request is executed preferentially to the write requests remaining in the cache memory. Thus, a read request can be executed efficiently.

As described above, according to the present invention, it is possible to execute efficiently a read request issued from a host computer when write requests are cached in a cache memory.

What is claimed is:

1. A data storage apparatus, comprising:
   a memory that has a plurality of storage areas that temporarily store write requests and read requests transferred from a host;
   a read/write head that performs write processing or read processing based on said write requests or said read requests;
   a storage medium on which write data is stored by said write processing of said read/write head and from which read data is read by said read processing;
   order holding means that holds a write order to said recording medium of said write requests stored in said memory; and
   write order determining means for changing a previous write order in said order holding means if, when a read request is transferred from said host, an area to store that read request cannot be secured in said memory.

2. A data storage apparatus according to claim 1, wherein said write order determining means, when an area to store that read request is secured in said memory when the oldest write request among said plurality of write requests stored in said memory is executed, makes said oldest write request first in the write order.

3. A data storage apparatus according to claim 2, wherein said read/write head, after executing write processing based on said oldest write request, executes read processing based on said read request, and then executes write processing based on other write requests stored in said memory.

4. A data storage apparatus according to claim 1, wherein said write order determining means, when it may happen that an area to store that read request is secured in said memory when an area to store that read request is not secured in a memory even though the oldest write request among said plurality of write request stored in said memory is executed and, also, other prescribed write requests stored in said memory together with said oldest write request are executed preferentially, makes the write order of said oldest write request and said prescribed write requests higher than the write order of other write requests stored in said memory.

5. A data storage apparatus according to claim 4, wherein said read/write head, after executing write processing based on said oldest write request and said prescribed write requests, executes read processing based on said read request, and then executes write processing based on said other write requests.

6. A data storage apparatus comprising:
   a head that performs processing at a prescribed access position of a recording medium;
   a cache memory that has a plurality of storage areas and caches a write request before execution of write processing by said head; and
   a controller that performs control so that write requests transferred from a host in a prescribed transfer order are read from said cache memory and also subjected to execution of write processing to said storage medium in a different order from that transfer order; and
   wherein said controller, based on an arrangement within said cache memory of storage areas in which said write requests are stored and storage areas in which said write requests are not stored, determines an order for said write requests to be read from said cache memory.

7. A data storage apparatus according to claim 6, wherein:
   said cache memory caches a read request transferred from a host; and
   said controller, when a storage area necessary for caching of said read request is not vacant in said cache memory at the time of transfer, refers to said arrangement within said cache memory of storage areas in which said write requests are stored and storage areas in which said write requests are not stored, and determines an order for said write requests to be read from said cache memory so as to secure a storage area necessary for caching of said read request.

8. A data storage apparatus according to claim 7, wherein said controller performs control so that, after a storage area necessary for caching of said read request is secured, said read request is cached in said cache memory, and also said read request is executed before a write request stored earlier in said cache memory.

9. A data processing apparatus that receives read requests and write requests transferred from a host, and also orders execution of said read requests and write requests with respect to a storage medium, said data processing apparatus, comprising:
   storing means that has storage areas that temporarily store said read requests and write requests:
   execution order holding means that holds an order for reading and executing said read requests and said write requests temporarily stored in said storing means; and
   write order determining means for changing an execution order of said write requests held in said execution order holding means so as to secure a storage area to store temporarily one of said read requests if a storage area to store temporarily said one of said read requests in said storing means cannot be secured at the time when said one of said read requests is received.

10. A data processing apparatus according to claim 9, wherein:
   said storing means allows storage of a new read request or write request on condition that a first stored one of said write requests is read; and
   said write order determining means changes an execution order of said write requests held in said execution order holding means on the premise that said first stored one of said write requests is read.

11. A data processing method whereby, after read requests and write requests transferred from a host have been cached, said read requests and write requests are executed with respect to a storage medium; in which data processing method the oldest write request among cached said write requests is executed, then said one of said read requests is executed, and thereafter other write requests excluding said oldest write request among cached said write requests are executed sequentially; and
   wherein when said one of said read requests cannot be cached at the time when said one of said read requests is received, said oldest write request among cached said write requests is executed.

12. A data processing method whereby, after read requests and write requests transferred from a host have been cached, said read requests and write requests are executed with respect to a storage medium; in which data processing method it is determined at the time when one of said read requests is received whether or not said one of said read requests can be cached, and if it is determined that said one of said read requests cannot be cached, prescribed write requests among cached said write requests are executed in order to provide a vacant area for caching said one of said read requests, then said one of said read requests is executed, and thereafter other write requests excluding said prescribed write requests among cached said write requests are executed.

13. A data processing method according to claim 12, wherein said prescribed write requests include the oldest write request among cached said write requests.

14. A data processing method according to claim 12, wherein execution of said prescribed write request and execution of other write requests excluding said prescribed write requests are performed in an order such that time required for the relevant execution is minimized.

* * * * *